United States Patent
Quintero Ramos (10) Patent No.: US 12,554,023 B2
(45) Date of Patent: Feb. 17, 2026

(54) VEHICLE LOCATING SYSTEM WITH SATNAV COORDINATE ENCODING

(71) Applicant: Positioning Universal Inc., San Diego, CA (US)

(72) Inventor: Francisco Alejandro Quintero Ramos, San Diego, CA (US)

(73) Assignee: POSITIONING UNIVERSAL INC., San Diego, CA (US)

( * ) Notice: Subject to any disclaimer, the term of this patent is extended or adjusted under 35 U.S.C. 154(b) by 293 days.

(21) Appl. No.: 18/331,557

(22) Filed: Jun. 8, 2023

(65) Prior Publication Data

US 2023/0408705 A1    Dec. 21, 2023

Related U.S. Application Data (60) Provisional application No. 63/350,131, filed on Jun. 8, 2022.

(51) Int. Cl.
*G01S 19/42* (2010.01)
*G01S 5/00* (2006.01)

(52) U.S. Cl.
CPC ............ *G01S 19/42* (2013.01); *G01S 5/0027* (2013.01)

(58) Field of Classification Search
CPC .......... G01S 19/34; G01S 19/37; G01S 19/42; G01S 5/0027
See application file for complete search history.

(56) References Cited

U.S. PATENT DOCUMENTS 7,602,480 B2 * 10/2009 Romain ............... G01C 21/005
356/139.01

OTHER PUBLICATIONS

M. Koegel, W. Kiess, M. Kerper and M. Mauve, "Compact Vehicular Trajectory Encoding," 2011 IEEE 73rd Vehicular Technology Conference (VTC Spring), Budapest, Hungary, 2011, pp. 1-5, doi: 10.1109/VETECS.2011.5956247. (Year: 2011).*

M. Koegel, D. Baselt, M. Mauve and B. Scheuermann, "A comparison of vehicular trajectory encoding techniques," 2011 The 10th IFIP Annual Mediterranean Ad Hoc Networking Workshop, Favignana Island, Italy, 2011, pp. 87-94, doi: 10.1109/Med-Hoc-Net.2011.5970498. (Year: 2011).*

* cited by examiner

*Primary Examiner* — Cassi J Galt
(74) *Attorney, Agent, or Firm* — Sheridan Ross P.C.

(57) ABSTRACT

The present disclosure is directed to a location tracking system and device that uses spline coefficients, a timing parameter, and a number n of spatial positions to be interpolated in a location message payload rather than the actual satellite coordinates.

14 Claims, 7 Drawing Sheets

VEHICLE LOCATING SYSTEM WITH SATNAV COORDINATE ENCODING

CROSS REFERENCE TO RELATED APPLICATIONS

The present application claims the benefits of and priority, under 35 U.S.C. § 119(e), to U.S. Provisional Application No. 63/350,131, filed Jun. 8, 2022, entitled "VEHICLE LOCATING SYSTEM WITH SATNAV COORDINATE ENCODING" of which the entire disclosure of which is incorporated by reference for all purposes.

BACKGROUND

The present disclosure is generally directed to location tracking sand, in particular, towards satellite-based location-tracking.

Location tracking has become increasingly important with advancements in computer technology. Location-based services (LBS), such as navigation software, social networking services, and location-based advertising, use control plane locating or positioning to map location information with geographical and symbolic information. In contrast, location tracking systems use satellite navigation systems to determine the location of a tracked object.

A "satellite navigation" or "satnav" system is a system that uses satellites to provide autonomous geo-spatial positioning. It allows small electronic receivers to determine their location (longitude, latitude, and altitude/elevation) to high precision (within a few centimeters to meters) using time signals transmitted along a line of sight by radio from satellites. The system can be used for providing position or navigation or for tracking the position of an object fitted with a satnav receiver (known as satellite tracking). The signals also allow the satnav receiver to calculate the current local time to high precision, which allows time synchronization. These uses are collectively known as Positioning, Navigation and Timing (PNT). Satnav systems operate independently of any telephonic or internet reception, though these technologies can enhance the usefulness of the positioning information generated.

A satellite navigation system with global coverage may be termed a global navigation satellite system (GNSS). GNSS examples include the Global Positioning System (GPS), Global Navigation Satellite System (GLONASS), BeiDou Navigation Satellite System (BDS), Galileo, Quasi-Zenith Satellite System (QZSS), and the planned global expansion of the Indian Regional Navigation Satellite System (IRNSS).

BRIEF SUMMARY

In certain embodiments, a method includes the steps: of
receiving, by an antenna of a location tracking device, a plurality of radionavigation signals from a plurality of satellites, each radionavigation signal comprising orbital data associated with a spatial position of a respective satellite and a time of radionavigation signal transmission by the respective satellite;
determining, by a microprocessor of the location tracking device, a plurality of spatial positions associated over time with the location tracking device based on the plurality of radionavigation signals;
transforming, by the microprocessor, the plurality of spatial positions into a plurality of spline coefficients defining a spline curve; and
transmitting, by the microprocessor, the spline coefficients, a timing parameter, and a number of the plurality of spatial positions to a location tracking server.

In some embodiments, a location tracking device includes:
an antenna;
a network interface in signal communication with the antenna;
a location tracking unit in communication with the network interface comprising:
a microprocessor; and
a computer-readable storage medium, coupled with the microprocessor, comprising instructions that, when executed by the microprocessor, cause the microprocessor to:
receive a plurality of radionavigation signals from a plurality of satellites, each radionavigation signal comprising orbital data associated with a spatial position of a respective satellite and a time;
determine a plurality of spatial positions associated over time with the location tracking device based on the plurality of radionavigation signals;
convert the plurality of spatial positions into a plurality of spline coefficients defining a spline curve; and
transmit the spline coefficients, a timing parameter, and a number of the plurality of spatial positions to a location tracking server.

In some embodiments, a location tracking server includes:
an antenna;
a network interface in signal communication with the antenna;
a microprocessor n communication with the network interface: and
a computer-readable storage medium, coupled with the microprocessor, comprising instructions that, when executed by the microprocessor, cause the microprocessor to:
receive, from a location tracking device, a location message, the location message comprising spline coefficients, a timing parameter, and a number of the spatial positions to be interpolated by the spline coefficients, the spatial positions being located on a path of travel of an object associated with the location tracking device;
interpolate each of the number of the number of spatial positions using a polynomial equation, the spline coefficients, and timing parameter; and
provide the number of spatial positions to a computational device for display to a user.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

BRIEF DESCRIPTION OF THE SEVERAL VIEWS OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

Various aspects of the present disclosure will be described herein with reference to drawings that may be schematic illustrations of idealized configurations.

Recurring technical problems with location tracking using satellite navigation systems for location information arise from Internet and cellular network bandwidth costs and constraints. As tracked objects change locations, the location tracking device on the tracked object sends to the location tracking system a location tracking message comprising a base latitude and longitude coordinate pair plus the latitude and longitude deltas to mirror spatial movement of the tracked object. As the number of satnav coordinate pairs in the location tracking message payload grows, the size of the payload increases linearly.

It is commonly required for the location tracking device to send the location tracking message to the location tracking server throughout the internet via cellular network data plans, to enable the location tracking server to know the various locations on the earth's surface temporally occupied by a tracked object (e.g., the object's path of movement). Data being sent through these kinds of networks is measured in bytes. There can be a substantial monetary cost associated with the sizes of such payloads, as this is how cellular network carriers make money from in the IoT (Internet of Things) industry.

The technical solution of the present disclosure is to replace the satnav coordinate pairs and deltas in the location tracking message payload with spline coefficients, a timing parameter that describes the starting or reference timestamp and time separation, or $\Delta t$, between transmission or receipt of each satnav coordinate pair, and a number of satnav coordinate pairs to interpolate by the the location tracking system using the spline function. The location tracking system can reconstruct the original satnav coordinate pairs—and waveform tracing the path of movement of the tracked object—by spline interpolation using the spline coefficients and specified timing parameter. Typically, there is a separate and independent set of spline coefficients for each of latitude and longitude. Sending the spline coefficients, timing parameter, and number of satnav pairs to interpolate can substantially reduce the required payload size relative to a payload including the base latitude and longitude pair plus the latitude and longitude deltas, without substantially increasing computational power in either the satnav receiver in the location tracking device or the location tracking system.

As will be appreciated, "spline" can refer to a wide class of functions that are used in applications requiring data interpolation and/or smoothing for data that is either one-dimensional or multi-dimensional. A spline curve is constructed from a sequence of points such that the curve's shape closely follows the point sequence. The points are known as control points. A curve that passes through each control point is called an interpolating curve while a curve that passes near to the control points but not necessarily through them is called an approximating curve. The spline employed in the present disclosure can be either an interpolating or approximating curve. While polynomial interpolation could alternatively be employed, spline interpolation not only yields similar results, even when using low degree polynomials, bit also avoids Runge's phenomenon for higher degree polynomials.

As will be appreciated, the technical solution's ability to use fewer bytes to convey selected satnav location information can mean a cheaper cost to send the message. This approach (using splines to encode latitude and longitude pairs and other satnav location information such as altitude/elevation), can allow a location tracking system to use a substantially fixed payload size to encode the same information (e.g., the fixed payload fields include the members of the set of spline coefficients (which can vary depending on the degree of the spline function), the timing parameter, and number of satnav pairs to be interpolated), regardless of the number of latitude and longitude coordinate pairs in question. Naive approaches to this (base latitude and longitude plus deltas) require payload sizes that increment linearly with the number of pairs included in the message payload. In contrast, a fixed payload size can be used by the location tracking device of this disclosure to encode the location information of an arbitrary number of latitude and longitude pairs. This novel approach can allow a location tracking device employing the technical solution to send much fewer bytes to convey the same information.

It is with respect to the above issues and other problems that the embodiments presented herein were contemplated.

Figure 1:
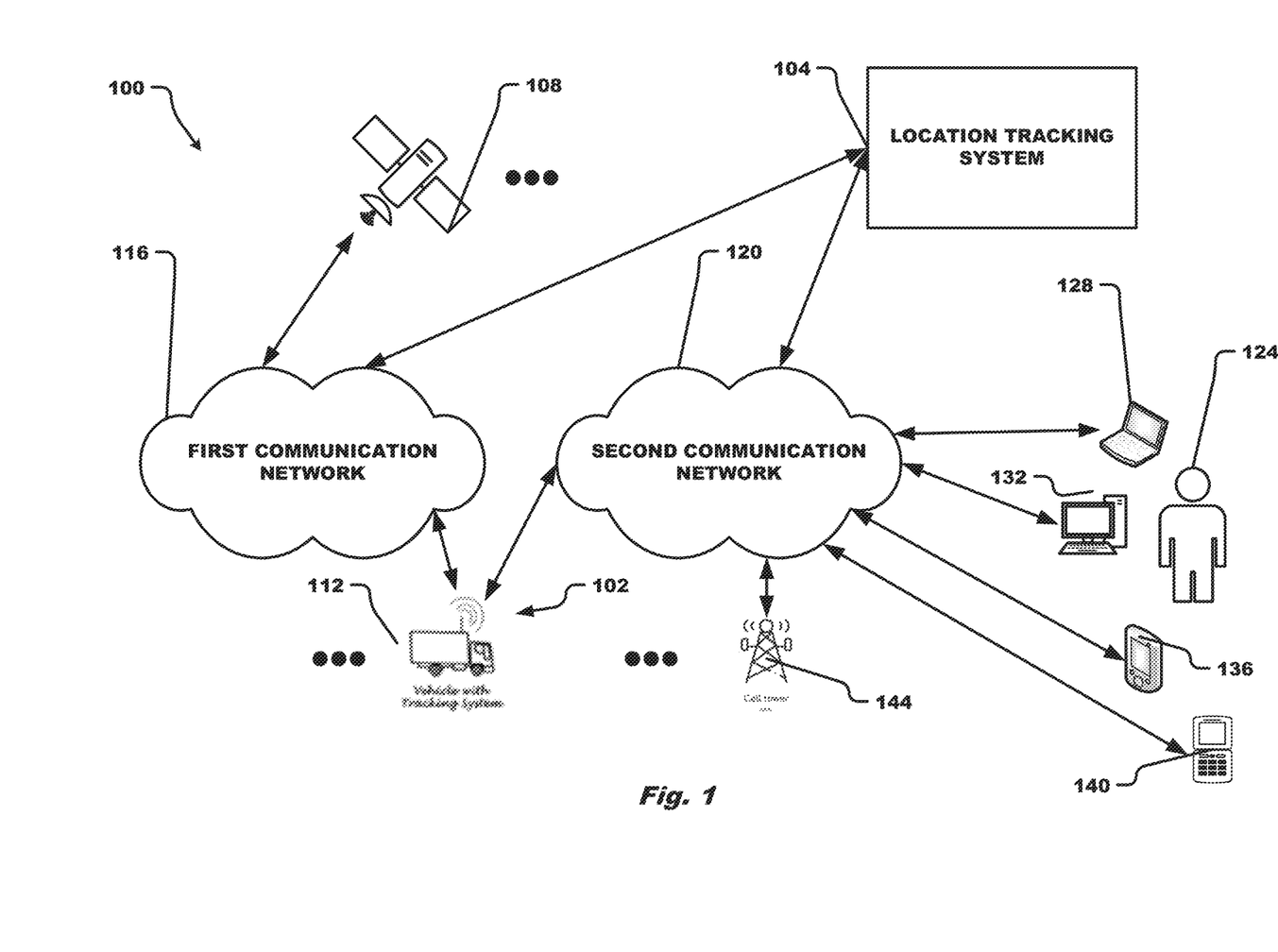
FIG. 1 is a block diagram of a location tracking system using a satellite navigation system in accordance with embodiments of the present disclosure.

Referring now to FIG. 1, a location tracking architecture 100, comprising a location tracking device 102 on a tracked vehicle 112 (shown as a truck), in communication with a satellite navigation system 108 via a first communication network 116 and with a location tracking system 104 via a second communication network 120, is shown in accordance with embodiments of the present disclosure. The location tracking system 104, in turn, is in communication with the satellite navigation system 108, via the first communication network 116, and one or more computational devices, such as a laptop 128, personal computer 132, personal digital assistant 136 (e.g., a tablet computer), and/or a smart phone 140, of a user 124 via the second communication network 120.

The tracked object 112 can be any inanimate object, such as a vehicle, aircraft, ship, trailer, storage container or other cargo, shipment, electronic device such as a smart phone, or other asset or an animate object, such as a person or animal. As shown, multiple tracked objects 112 can be location tracked simultaneously.

The satellite navigation system 108 can be any global or regional satnav system and typically includes not only satellites but also ground stations to monitor and control satellites and receivers to listen for signals from the satellites. The satellite navigation system 108 is typically a hyperbolic system whose transmitters are in selected orbits. That the satellites move with respect to the receiver requires that the calculation of the positions of the satellites must be considered. Satellite navigation systems send several signals that are used to decode the satellite's position, measure distance between the satnav receiver or location tracking device and the satellite, and the precise time of receipt of each signal. One signal encodes the satellite's ephemeris data, which is used to accurately calculate the satellite's location at any time. Space weather and other effects can cause the orbit to change over time so the ephemeris has to be updated periodically. Other signals send out the time as measured by the satellite's onboard atomic clock. By measuring signal times of arrival (TOAs) from at least four satellites, a satnav receiver or location tracking device can re-build an accurate clock signal of its own and allow hyperbolic navigation to be carried out.

The first communication network 116 is typically a radio network configured to operate with the satellite navigation system 108 to provide radionavigation-satellite service.

The second communication network 120 may comprise any type of known communication medium or collection of communication media and may use any type of protocols to transport messages between endpoints. The second communication network 120 may include wired and/or wireless communication technologies (as shown by plural base stations 144). The Internet is an example of the second communication network 120 that constitutes an Internet Protocol ("IP") network comprising computers, computing networks, and other communication devices located all over the world, which are connected through many telephone systems and other means. Other examples of the second communication network 120 include, without limitation, a standard Plain Old Telephone System ("POTS"), an Integrated Services Digital Network ("ISDN"), the Public Switched Telephone Network ("PSTN"), a Local Area Network ("LAN"), a Wide Area Network ("WAN"), a VoIP network, a Session Initiation Protocol ("SIP") network, a cellular network, and any other type of packet-switched or circuit-switched network known in the art. In addition, it can be appreciated that the second communication network 120 need not be limited to any one network type, and instead may be comprised of a number of different networks and/or network types. The second communication network 120 may comprise a number of different communication media such as coaxial cable, copper cable/wire, fiber-optic cable, antennas for transmitting/receiving wireless messages, and combinations thereof.

Figure 2:
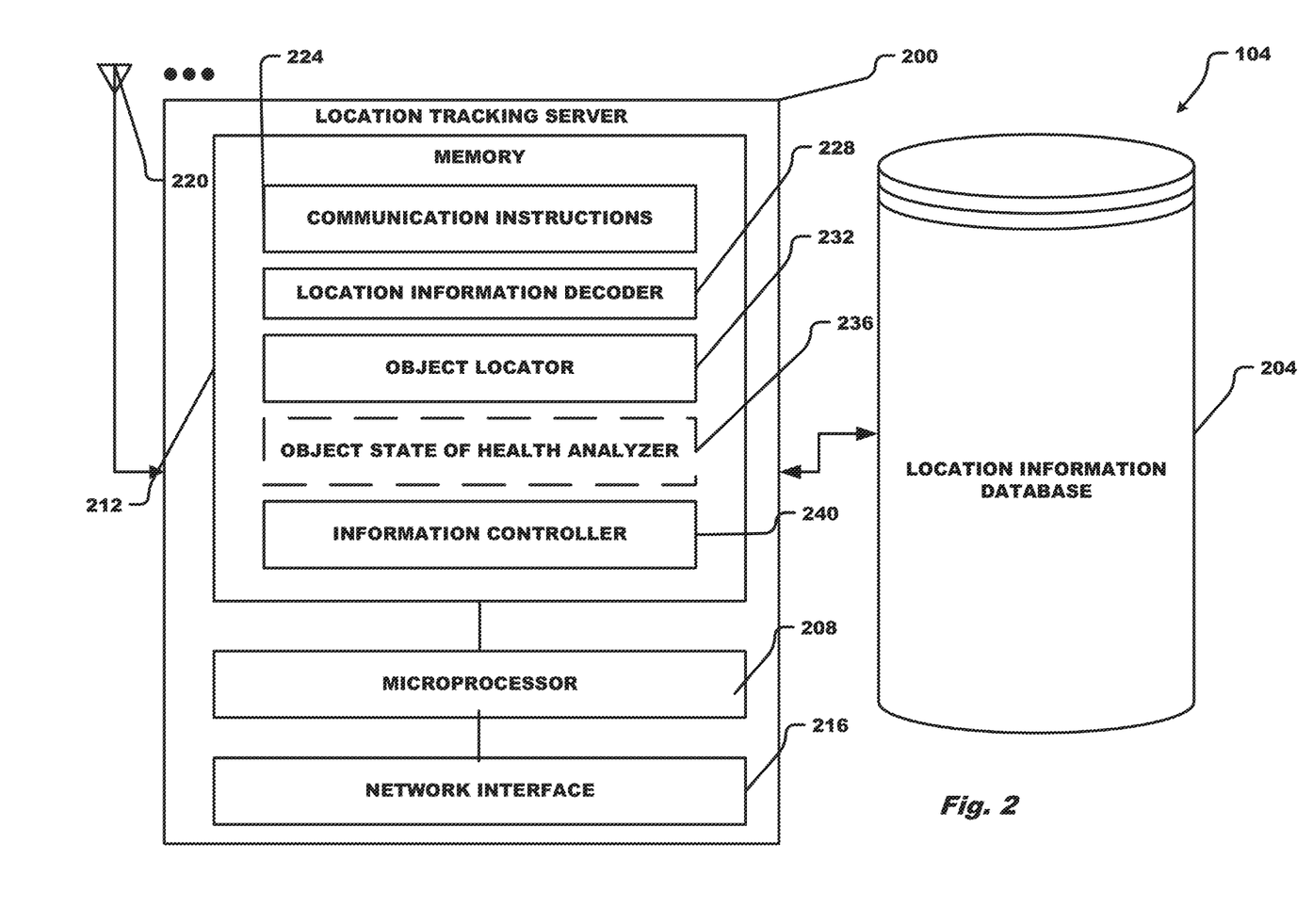
FIG. 2 is a block diagram of the location tracking system in accordance with embodiments of the present disclosure.

Referring now to FIG. 2, a block diagram of a location tracking system 104 is depicted in accordance with an embodiment of the present disclosure.

The location tracking system 104 is shown to include a location tracking server 200 and attached location information database 204. The location tracking server 200, in turn, includes a processor 208, memory 212, a network interface 216, and plural antennas 220 (such as an RF antenna, WiFi antenna and driver circuit, Bluetooth antenna and driver circuit, or a cellular communication antenna and driver circuit) in signal communication with the network interface 216.

In some embodiments, the microprocessor 208 may correspond to one or many microprocessors, CPUs, microcontrollers, Integrated Circuit (IC) chips, or the like. For instance, the processor 604 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the microprocessor 208 may be provided as a microcontroller, microprocessor, Central Processing Unit (CPU), or plurality of microprocessors that are configured to execute the instructions sets stored in memory 212. In some embodiments, the instruction sets stored in memory 212, when executed by the microprocessor 208, may enable the location tracking server 200 to provide object tracking and state of health analysis of the tracked object.

The nature of the network interface 216 may depend upon the server configuration. Examples of a suitable network interface 216 include, without limitation, an Ethernet port, a USB port, an RS-232 port, an RS-485 port, a NIC, an antenna, a driver circuit, a modulator/demodulator, etc. The network interface 216 may include one or multiple different network interfaces depending upon whether the location tracking server 200 is connecting to a single (second) communication network 120 or multiple different types of (second) communication networks 120.

The memory 212 may include one or multiple computer memory devices that are volatile or non-volatile. The memory 212 may include volatile and/or non-volatile memory devices. Non-limiting examples of memory 212 include Random Access Memory (RAM), Read Only Memory (ROM), flash memory, Electronically-Erasable Programmable ROM (EEPROM), Dynamic RAM (DRAM), etc.

The memory 212 may be configured to store the instruction sets depicted in addition to temporarily storing data for the microprocessor 208 to execute various types of routines or functions. The instruction sets can enable user interaction with the location tracking server 200 and real time tracked object location and state of health determinations. Examples of instruction sets that may be stored in the memory 212 include communication instructions 224, location information decoder 228, object locator 232, optional object state of health analyzer 236, and information controller 240.

The communication instruction set 224 may enable the location tracking server 200 to exchange electronic communications, either directly or indirectly, with communication device of the user 124 (e.g., the laptop 128, personal computer 132, personal digital assistant 136, and/or smart phone 140) or the location tracking device 102, respectively.

In some embodiments, the location information encoder/decoder instructions 228, when executed by the microprocessor 208, may enable the server 200 to send and receive encoded wireless signals, demodulate received wireless signals, decode the demodulated signal and perform the necessary transformations to determine the data in the signal, transform and encode data to be emitted by the antenna 220 and modulate encoded data for transmission.

In some embodiments, the object locator instructions 232, when executed by the microprocessor 208, may enable the server 200 to transform the spline coefficients, timing parameter, and number of pairs of satnav coordinates into corresponding satnav coordinates (e.g., pairings of latitude, longitude, and altitude/elevation coordinates). Generally and as discussed in detail below, the transformation comprises applying the same spline function originally applied by the location tracking device 102 to convert the satnav coordinates into the received spline coefficients, timing parameter, and number of pairs of satnav coordinates to be interpolated. As discussed below, the spline function can be any degree, whether a linear spline or a natural cubic spline, and correspond to an interpolating or approximating curve.

The object state of health analyzer instructions 236, when executed by the microprocessor 208, may enable the server 200 to determine a state of health of the tracked object. By way of example, the state of health for a vehicle can refer to one or more of tire pressure, oil pressure, engine revolutions per minute, speed, battery state of health, voltage, engine temperature, fuel level, or other monitored parameter. A particular set of state of health parameters can be linked to one or more of the satnav coordinates in the location information database 204.

The information controller instructions 240, when executed by the microprocessor 208, can cause the server 200 to store the above location and state of health information and other received information (e.g., unique identity of the tracked object (such as a serial number of the object or the location tracking device 102 or license number of the object) and unique identity of an associated entity (e.g., an owner or proprietor of the tracked object) in the location information database 204.

The location information database 204 may be configured to store one or multiple data structures that are used in connection with tracked objects and associated location tracking devices. The databases can use any database model and compatible database management system. Examples of database models include relational databases, object-oriented databases, and non-relational databases, such as NoSQL and NewSQL databases. A database management system (DBMS) (not shown) can define, manipulate, retrieve and manage the data in the location information database. The DBMS generally manipulates the data itself, the data format, field names, record structure and file structure. It also defines rules to validate and manipulate this data. To maintain the confidentiality of stored location information for different tracked object owners and/or proprietors, the stored data can be encrypted, the database partitioned, query restriction, perturbation, and the like.

When the tracked object is a vehicle, the location tracking server 200 can use the vehicle position to calculate other useful information such as speed, bearing, track, trip distance, distance to destination and others using time difference between measured signals and present this information, current object location, and state of health to the user.

Figure 3:
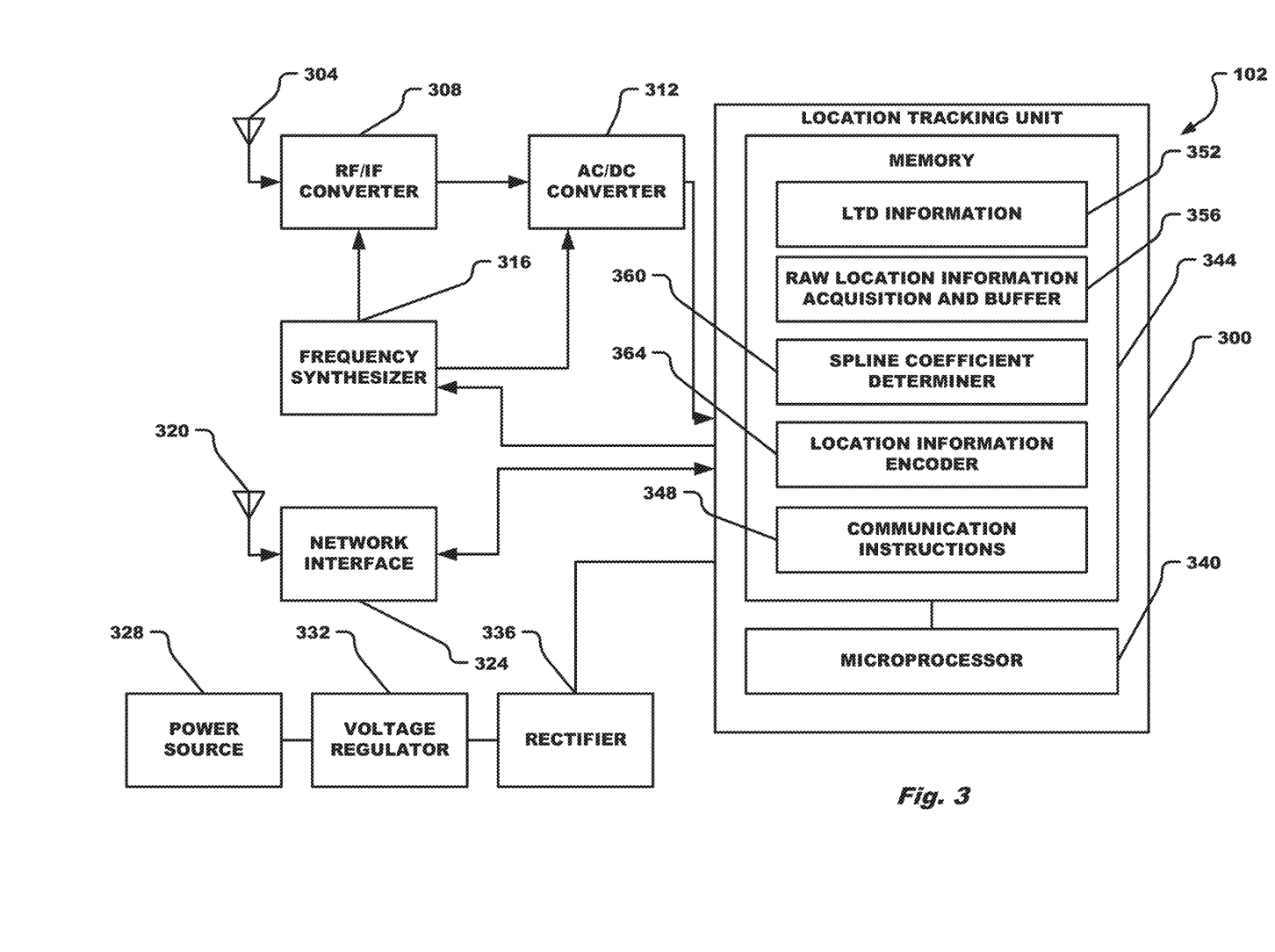
FIG. 3 is a block diagram of the object location tracking device in accordance with embodiments of the present disclosure.

Referring now to FIG. 3, a block diagram of a location tracking device 102 is depicted in accordance with an embodiment of the present disclosure.

The location tracking device 102 is shown to include a location tracking unit 300 engaged with a first antenna 304 (such as an RF antenna) to receive signals from and send signals to the satellite navigation system 108 via the first communication network 116 in communication with an RF/IF converter 308, AC/DC converter 312 and frequency synthesizer 316, a second antenna 320 (such as a WiFi antenna and driver circuit, Bluetooth antenna and driver circuit, or a cellular communication antenna and driver circuit) and network interface 324 to receive signals from and send signals to the location tracking system 104 via the second communication network 120, and a power source 328, voltage regulator 332, and rectifier 336 to supply electrical energy to the location tracking unit 300.

The signals transmitted from satellite navigation system 108 are received at the first antenna 304. Through the radio frequency (RF) chain, the input signal is amplified by the RF/IF converter 308 to a selected amplitude, and the frequency is converted by the frequency synthesizer 316 to a desired output frequency. The analogue-to-digital converter (ADC) 312 is used to digitize the amplified and frequency-adjusted input signal.

The configuration of the network interface 324 in signal communication with the second antenna 320 may depend upon the location tracking device 102. Examples of a suitable network interface 324 include, without limitation, an Ethernet port, a USB port, an RS-232 port, an RS-485 port, a NIC, an antenna, a driver circuit, a modulator/demodulator, etc. The network interface 324 may include one or multiple different network interfaces depending upon whether the location tracking device 102 is connecting to a single (second) communication network 120 or multiple different types of (second) communication networks 120.

The power source 328 may correspond to an internal power supply that provides AC and/or DC power to components of the location tracking device 102. In some embodiments, the power source 328 may correspond to one or multiple batteries or capacitors or other electromagnetic energy storage devices. Alternatively or additionally, the power source 328 may include a power adapter or wireless charger that converts AC power into DC power for direct application to components of the location tracking device 102, for charging a battery, for charging a capacitor, or a combination thereof.

The location tracking unit 300, in turn, includes a microprocessor 340 and memory 344.

In some embodiments, the microprocessor 340 may correspond to one or many microprocessors, CPUs, microcontrollers, Integrated Circuit (IC) chips, or the like. For instance, the processor 604 may be provided as silicon, as a Field Programmable Gate Array (FPGA), an Application- Specific Integrated Circuit (ASIC), any other type of Integrated Circuit (IC) chip, a collection of IC chips, or the like. As a more specific example, the microprocessor 208 may be provided as a microcontroller, microprocessor, Central Processing Unit (CPU), or plurality of microprocessors that are configured to execute the instructions sets stored in memory 344. In some embodiments, the instruction sets stored in memory 344, when executed by the microprocessor 340, may enable the location tracking unit 300 to provide object tracking location information and state of health parameters of the tracked object.

The memory 344 may include one or multiple computer memory devices that are volatile or non-volatile. The memory 344 may include volatile and/or non-volatile memory devices. Non-limiting examples of memory 344 include Random Access Memory (RAM), Read Only Memory (ROM), flash memory, Electronically-Erasable Programmable ROM (EEPROM), Dynamic RAM (DRAM), etc.

The memory 344 may be configured to store the instruction sets depicted in addition to temporarily storing data for the microprocessor 340 to execute various types of routines or functions. The instruction sets can enable interaction with the location tracking server 200 and real time tracked object location and state of health monitoring. Examples of instruction sets that may be stored in the memory 344 include communication instructions 348, location tracking device or LTD information 352, raw location information acquisition and buffer 356, spline coefficient determiner 360, and location information decoder 364.

The communication instruction set 348 may enable the location tracking device 102 to exchange electronic communications, either directly or indirectly, with location tracking system 104.

The LTD information 352 can include desired information to enable unique identification of the object tracked, the owner or proprietor of the tracked object, and/or the location tracking device 102 as well as other information discussed below. Examples include unique identifiers such as serial numbers, customer identification numbers, and the like.

In some embodiments, the raw location information acquisition and buffer instructions 356, when executed by the microprocessor 340, may enable the location tracking device 102 to determine and buffer a current set of latitude and longitudinal satnav coordinate pairs for transformation into spline coefficients. In a technique commonly known as triangulation or trilateration, the location tracking device 102 roughly determines its latitude and longitude position by locking on to satellite signals broadcast by at least three satellites and roughly determines its latitude and longitude position and its altitude or elevation position by locking on to satellite signals broadcast by at least four satellites in the satellite navigation system 108.

Satellite signals typically include navigation data. The navigation data comprises the source satellite's unique pseudorandom number code (PNC) or digital signature unique to each satellite and orbital data. The orbital data includes orbital ephemeris data comprising details about the current time, the location, and the health of the source satellite and almanac data regarding data in every satellite and state of the satellite navigation system. The orbital data typically includes a rough almanac for all satellites to aid in finding them, and a precise ephemeris for the source satellite. The orbital ephemeris is transmitted in a data message that is superimposed on a code that serves as a timing reference. The location tracking device communicates with each selected satellite by a process known as acquisition.

The timestamp embedded in the satellite signals comprises precise timing information. The timestamp is output by an atomic clock in the satellite to maintain synchronization of all the satellites in the constellation.

To calculate accurate location of the tracking device 102 receiver, the exact positions of the satellites in the satellite navigation system need to be known at all times as the satellites serve as reference points. The ground-based monitoring stations and ground antennas, which constantly check satellite's speed, position and altitude, look for any orbital (ephemeris) errors such as gravitational pull from moon, sun and solar radiation pressure. The monitors relay this information back to satellites, which incorporate it into the satellite signals as almanac data and other orbital data.

The location tracking device uses trilateration or triangulation based on the satellite signals from plural satellites to estimate earth latitude, earth longitude, and altitude or elevation of the location tracking device and time. The location tracking device can compare the time of broadcast encoded in the transmission of three (at sea level) or four (which allows an altitude calculation also) different satellites, measuring the time-of-flight to each satellite. Several such measurements can be made at the same time to different satellites, allowing a continual fix to be generated in real time using an adapted version of trilateration. Alternatively assuming that signals are synchronous, the tracking device can compare the satellite signal's pseudorandom number code (PNC) with the tracking device's PNC to determine the signal's travel time. To compute the distance between the receiver and satellites, this value is multiplied by the speed of light. Each distance measurement, regardless of the system being used, places the receiver on a spherical shell at the measured distance from the satellite broadcaster. By taking several such measurements and then looking for a point where they meet, a fix is generated. However, in the case of fast-moving satnav receivers, the position of the signal moves as signals are received from several satellites. In addition, the radio signals slow slightly as they pass through the ionosphere, and this slowing varies with the receiver's angle to the satellite, because that changes the distance through the ionosphere. The basic computation thus attempts to find the shortest directed line tangent to four oblate spherical shells centered on four satellites. Satellite navigation receivers reduce errors by using combinations of signals from multiple satellites and multiple correlators, and then using techniques such as Kalman filtering to combine the noisy, partial, and constantly changing data into a single estimate for position, time, and velocity.

The raw location information acquisition and buffer instructions 356 process the incoming digitized satellite signals as set forth above. In some embodiments, the raw location information acquisition and buffer instructions 356 can find the phase transition of the orbital data. From the orbital data phase transition, the sub-frames and other data, such as ephemeris data and pseudo-ranges, can be obtained from the orbital. Finally, the location tracking device 102 position can be calculated for the satellite positions and the pseudo-ranges.

In some embodiments, the location tracking device 102 can request the location tracking server 200 to send information on satellites in view at the location tracking device's approximate location, including Doppler predictions. After a snapshot of satellite navigation system 108 satellite RF data has been stored in the memory 344 as LTD information, the microprocessor 340 can process the RF signals from the satellite navigation system 108.

The spline coefficient determiner instructions, when executed by the microprocessor 340, can transform the pseudo-ranges measurements, along with the statistical information to spline coefficients, a timing parameter, and a number of pairs of satnav coordinates for transmission to the location tracking server 200.

This process will be illustrated with reference to the following nonlimiting example. Although the example references cubic spline interpolation, any degree of polynomial may be employed.

In cubic spline interpolation, the goal is to find spline coefficients A, B, C and D so that given control points (such as satnav coordinate pairs) satisfy the following polynomial equation:

$$y(x)=Ax^3+Bx^2+Cx+D$$

As will be appreciated, four control points are needed to get those four coefficients:

$$(x0,y0),(x1,y1),(x2,y2),(x3,y3)$$

Then, once those coefficients are found, the interpolation can be performed from in the range [x0, x3] using any delta x, to get as many points as needed in that range.

For the particular case of satnav latitude and longitude, two sets of coefficients are generally needed, and both will be a function of time, so the equation will become:

$$\text{lat}(t)=At^3+Bt^2+Ct+D$$

$$(t0,\text{lat}0),(t1,\text{lat}1),(t2,\text{lat}2),(t3,\text{lat}3)$$

$$\text{long}(t)=Et^3+Ft^2+Gt+H$$

$$(t0,\text{long}0),(t1,\text{long}1),(t2,\text{long}2),(t3,\text{long}3)$$

Then, A, B, C, D, E, F, G, H, delta t, the starting time "t" for the interpolation ($t_{start}$), and number of points to interpolate (n), will be sent to the location tracking server 200.

Stated differently, the spline coefficient determiner instructions 360 cause the microprocessor 340 to identify four control points, (t0, lat0), (t1, lat1), (t2, lat2), (t3, lat3), for latitude and four control points, (t0, long0), (t1, long1), (t2, long2), (t3, long3), for longitude and, for each set of control points determine separate sets of spline coefficients describing an interpolating or approximating curve, respectively. The spline coefficients and timing parameter $t_{start}$ and the $\Delta t$ (the constant time interval between temporally adjacent control points) along with the number (n) of points to be interpolated can be used by the location tracking server 200 to interpolate the source satnav coordinate pair for each corresponding timing signal ($t_{start}+(n-1)\Delta t$).

As will be appreciated, other satnav coordinates can be transformed by this technique. For example, altitude or elevation coordinates can also be transformed according to the same cubic polynomial equation. By way of illustration, the altitude or elevation coordinates are provided by the following spline function:

$$\text{alt}(t)=It^3+Jt^2+Kt+L$$

$$(t0,\text{alt}0),(t1,\text{alt}1),(t2,\text{alt}2),(t3,\text{alt}3)$$

Then, I, J, K, L, delta t, the starting time "t" for the interpolation ($t_{start}$), and number of points to interpolate (n), will be sent to the location tracking server 200 along with the variables noted above for latitude and longitude.

When the path of travel of the object is a waveform with multiple transition points (e.g., inflection points), the cubic spline interpolation can be implemented as a series of piecewise polynomial curves, each polynomial curve in the series having independent control points and spline coefficients. While the interpolation may be performed with a single higher degree polynomial curve, such as a $5^{th}$ degree polynomial with six coefficients, such polynomial curves with degrees higher than three can be very sensitive to the positions of the control points and more difficult to solve for an object moving along an arbitrary path.

The use of piecewise polynomial curves will be described with reference to FIG. 4.

Figure 4:
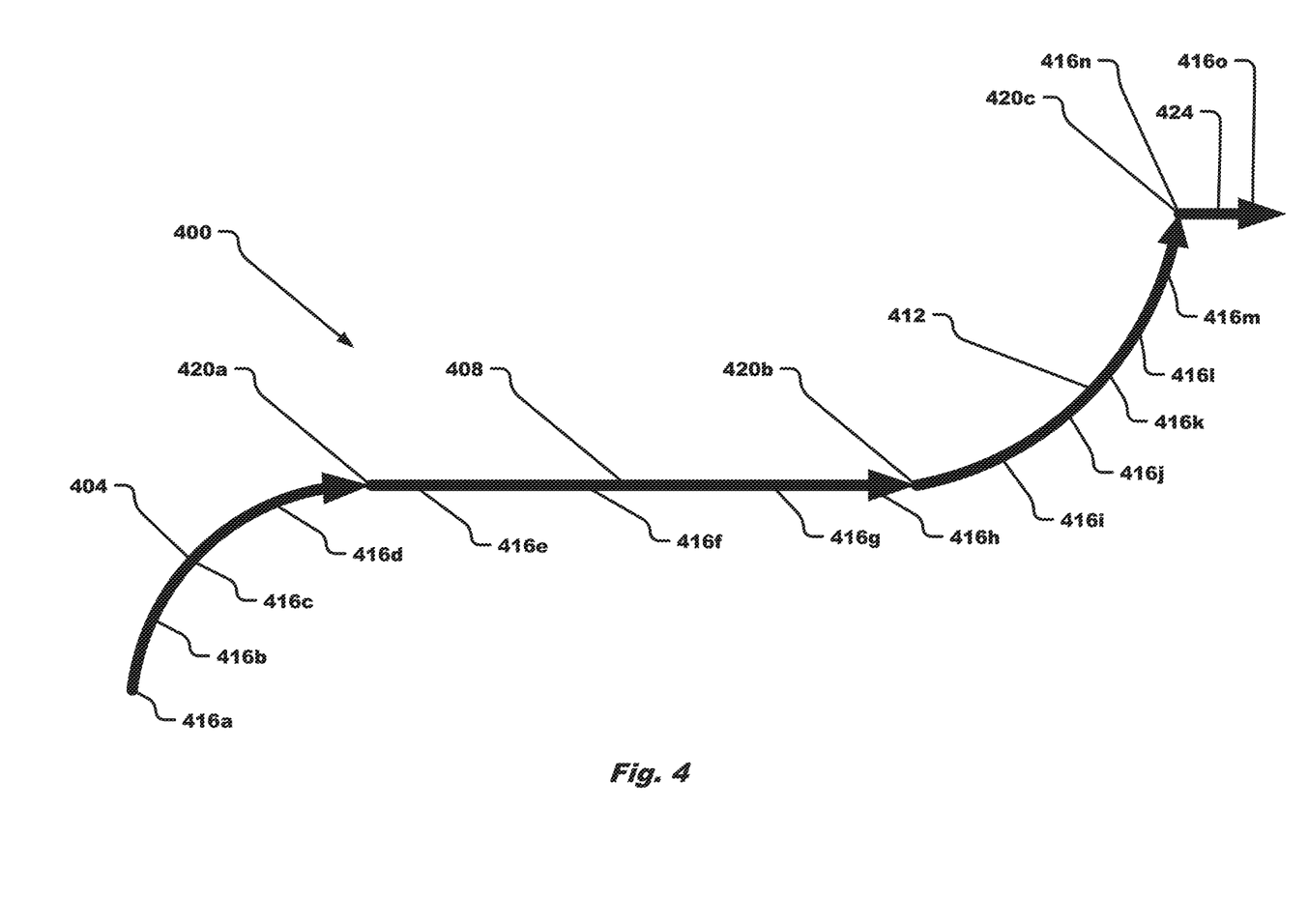
FIG. 4 is a plan view of a path of travel of a tracked object in accordance with an embodiment of the present disclosure.

FIG. 4 shows a vehicle's path of movement 400 having four independent polynomial segments, namely a first curved segment 404, a second linear segment 408, and a third curved segment 412, and a fourth linear segment 424. The first curved segment 404 has satnav coordinate pairs, or control points, 416a-d, the second linear segment 408 has satnav coordinate pairs, or control points, 416e-h, the third curved segment 412 has satnav coordinate pairs, or control points, 416-i-m, and the fourth linear segment 424 has at least satnav coordinates, or control point 416o. As can be seen from the variable distance between adjacent control points, the vehicle decelerates as it enters the first segment 404 and accelerates as it leaves the first segment 404; accelerates along most of the second linear segment 408 but decelerates near the end of the second linear segment as it approaches the third curved segment 412, and decelerates as it moves along the third curved segment 412. The vehicle stops at the end of the third curved segment 412 and makes a right-hand turn on the fourth linear segment 424. The spline coefficients $A_1$, $B_1$, $C_1$, and $D_1$ for latitude and $E_1$, $F_1$, $G_1$, and $H_1$ for longitude and the $t_{start}$ for the first curved segment 404 will be different from and independent of the corresponding ones of $A_2$, $B_2$, $C_2$, and $D_2$ for latitude and $E_2$, $F_2$, $G_2$, and $H_2$ for longitude and the $t_{start}$ for the second linear segment 408; the spline coefficients $A_2$, $B_2$, $C_2$, and $D_2$ for latitude and $E_2$, $F_2$, $G_2$, and $H_2$ for longitude and the $t_{start}$ for the second linear segment 408 will be different from and independent of the corresponding ones of $A_3$, $B_3$, $C_3$, and $D_3$ for latitude and $E_3$, $F_3$, $G_3$, and $H_3$ for longitude and the $t_{start}$ for the third linear segment 412, and the spline coefficients $A_1$, $B_1$, $C_1$, and $D_1$ for latitude and $E_1$, $F_1$, $G_1$, and $H_1$ for longitude and the $t_{start}$ for the first curved segment 404 will be different from and independent of the corresponding ones of $A_3$, $B_3$, $C_3$, and $D_3$ for latitude and $E_3$, $F_3$, $G_3$, and $H_3$ for longitude and the $t_{start}$ for the third linear segment 412.

As the tracked object moves along the first curved segment 404, it receives and buffers the satnav coordinate pairs 416a-d and, when a determined number of satnav coordinate pairs has been received and buffered (e.g., 4), applies the cubic polynomial above for each coordinate type (e.g., latitude and longitude), to determine the spline coefficients $A_1$, $B_1$, $C_1$, $D_1$, $E_1$, $F_1$, $G_1$, $H_1$. The location tracking device 102, applying the cubic polynomial using the spline coefficients $A_1$, $B_1$, $C_1$, $D_1$, $E_1$, $F_1$, $G_1$, $H_1$, $t_{start}$ for the first curved segment 404, $\Delta t$, and n=5, determines that the next or fifth set of satnav coordinate pairs 416e passed is not a valid interpolation and therefore concludes that a transition point 420a has been passed and a new set of spline coefficients for the cubic polynomial needs to be determined. The location tracking device 102 sends a location message to the location tracking server 200 including the spline coefficients $A_1$, $B_1$, $C_1$, $D_1$, $E_1$, $F_1$, $G_1$, $H_1$, $t_{start}$ for the first curved segment 404, $\Delta t$, and number n=4 to enable interpolation of satnav coordinates 416a-d by the location tracking server 200.

As the tracked object moves along the second linear segment 408, it receives and buffers the satnav coordinate pairs 416e-h and, when a determined number of satnav coordinate pairs has been received and buffered (e.g., 4), applies the cubic polynomial above for each coordinate type (e.g., latitude and longitude), to determine the spline coefficients $A_2$, $B_2$, $C_2$, $D_2$, $E_2$, $F_2$, $G_2$, $H_2$ and a new $t_{start}$ for the second linear segment 408. The location tracking device 102, applying the cubic polynomial using the spline coefficients $A_2$, $B_2$, $C_2$, $D_2$, $E_2$, $F_2$, $G_2$, $H_2$, $t_{start}$ for the second linear segment 408, $\Delta t$, and number n=5 determines that the next set of satnav coordinate pairs 416i (or fifth set encountered for the new $t_{start}$ for the second linear segment 408) is not a valid interpolation and therefore concludes that a transition point 420b has been passed and a new set of spline coefficients for the cubic polynomial needs to be determined. The location tracking device 102 sends a location message to the location tracking server 200 including the spline coefficients $A_2$, $B_2$, $C_2$, $D_2$, $E_2$, $F_2$, $G_2$, $H_2$, $t_{start}$ for the second linear segment 408, $\Delta t$, and number n=4 to enable interpolation of satnav coordinates 416e-h by the location tracking server 200.

As the tracked object moves along the third curved segment 412, it receives and buffers the satnav coordinate pairs 416i-1 and, when a determined number of satnav coordinate pairs has been received (e.g., 4), applies the cubic polynomial above for each coordinate type (e.g., latitude and longitude), to determine the spline coefficients $A_3$, $B_3$, $C_3$, $D_3$, $E_3$, $F_3$, $G_3$, $H_3$ and the $t_{start}$ for the third linear segment 412.

Depending on the configuration, the location tracking device 102 can continue to buffer more satnav coordinates or send a location message to the location tracking server 200 including the spline coefficients $A_3$, $B_3$, $C_3$, $D_3$, $E_3$, $F_3$, $G_3$, $H_3$, $t_{start}$ for the third curved segment 412, $\Delta t$, and number n=4 to enable interpolation of satnav coordinates 416i–1 by the location tracking server 200.

The location tracking device 102, applying the cubic polynomial using the spline coefficients $A_3$, $B_3$, $C_3$, $D_3$, $E_3$, $F_3$, $G_3$, $H_3$, $t_{start}$ either for the third curved segment 412 in the former configuration or equal to the time of receipt of the fifth set of satnav coordinate pairs 416m in the latter configuration, $\Delta t$, and number n=6 in the former configuration and n–=2 in the latter configuration determines that each of the next sets of satnav coordinate pairs 416m-n in its path of travel is a valid interpolation and therefore concludes that no transition point has been passed.

The location tracking device buffers satnav coordinates 416m-n and receives satnav and buffers satnav coordinates 416o. The location tracking device 102 applying the cubic polynomial using the spline coefficients $A_3$, $B_3$, $C_3$, $D_3$, $E_3$, $F_3$, $G_3$, $H_3$, appropriate $t_{start}$ for the third curved segment 412, $\Delta t$, and appropriate number n, determines that a further set of satnav coordinates 416o is not a valid interpolation, a transition point 420c has been passed, and a new set of spline coefficients for the cubic polynomial needs to be determined. In response, the location tracking device 102 sends a location message to the location tracking server 200 including the spline coefficients $A_3$, $B_3$, $C_3$, $D_3$, $E_3$, $F_3$, $G_3$, $H_3$, appropriate $t_{start}$, $\Delta t$, and appropriate number n to enable interpolation of satnav coordinate pairs 416i-m or 416l-m (depending on the configuration by the location tracking server 200.

The tracking device 102 continues these operations as it moves along the fourth linear segment 424. As will be appreciated, the spline coefficients for the second and fourth linear segments will define a linear spline while the spline coefficients for the first and third curved segments will define a cubic spline. To convey this in the location message, the spline coefficients A and B and E and F will have zero values in the former case and nonzero values in the latter case, and the spline coefficients C and D and G and H will have nonzero values in both cases.

Returning to FIG. 3 in some embodiments, the location information encoder instructions 364, when executed by the microprocessor 340, constructs the payload for the location message for transmission for transmission by the network interface 324 and antenna 320 in response to execution by the microprocessor 340 of the communication instructions 348, thereby enabling the location tracking unit 300 to determine remotely the tracked position and path of movement. As will be appreciated from the above example, the location message could be sent by the microprocessor 340 when a determined number of satnav coordinates is received and buffered or when a transition point is passed, whichever occurs first. Buffering too many pairs of satnav coordinates before sending a location message, while further reducing bandwidth requirements and cost, can cause too much latency between a current actual tracked object position and the tracked object simultaneously displayed or otherwise provided to the user 124. The stimulus for sending the location message is generally selected so as to balance these considerations and realize an acceptable message transmission frequency range.

Figure 5:
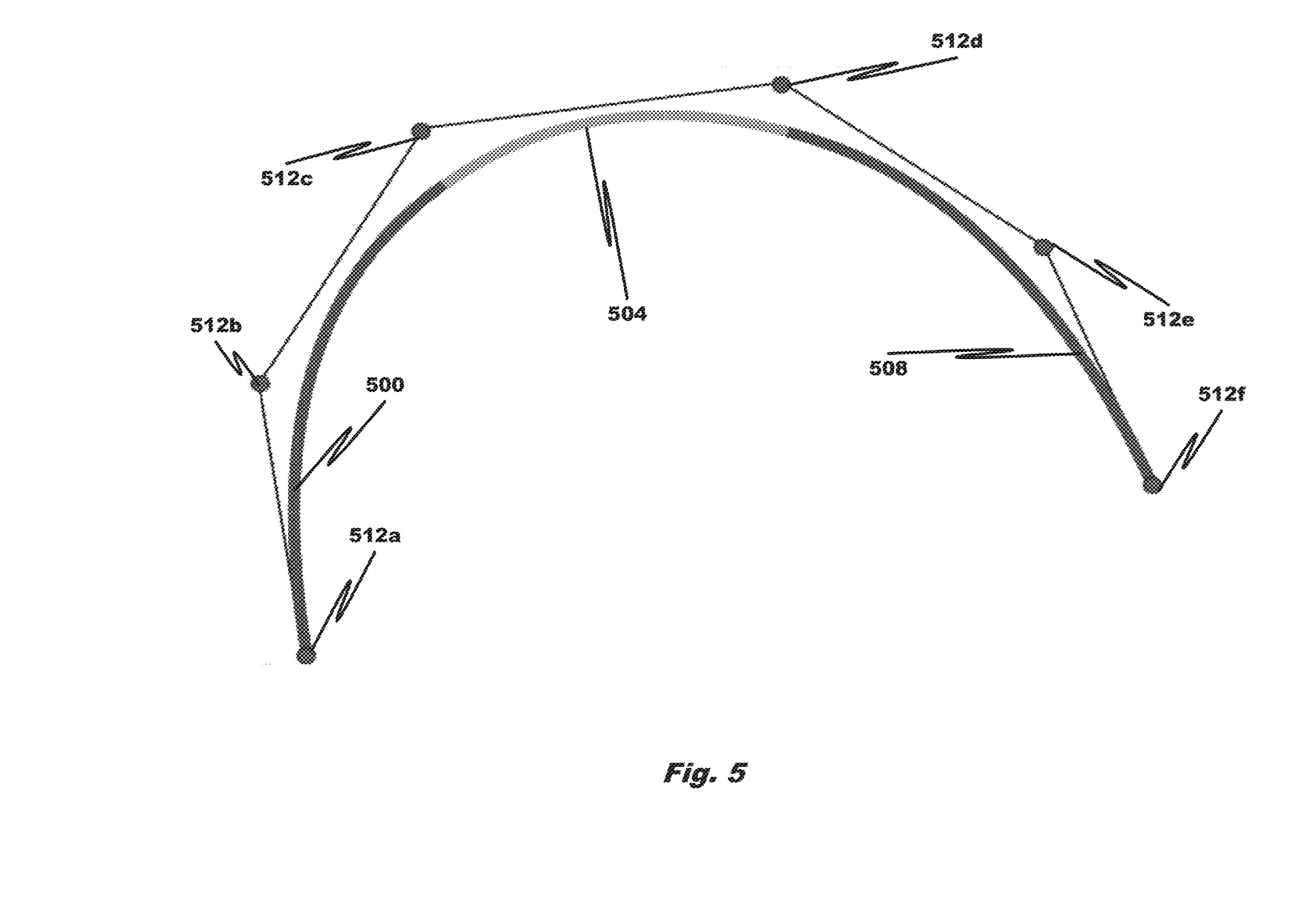
FIG. 5 illustrates a spline function defined piecewise by polynomials in accordance with embodiments of the present disclosure.

While the foregoing discussion has referenced interpolating curves, FIG. 5 depicts an approximating curve that can also be employed by the location tracking device 102 and server 200. FIG. 5 depicts a path of tracked object travel as a piecewise polynomial comprising three curve segments 500, 504, and 508. The satnav coordinate pairs 512a-f are not collocated on the segments 500, 504, and 508. The three cubic polynomials can meet with $C^2$ continuity. As will be appreciated, the spline coefficients can correspond to continuity $C^0$ (or the two adjoining segments match values at the join), $C^1$ (or the two adjoining segments match slopes at the join), and $C^2$ (or the two adjoining segments match curvatures at the join) constraints. The piecewise polynomial can have one or more of these types of continuity. Location of the satnav coordinate pairs 512a and 512f on the first and third curve segments 500 and 508 ensure that the curve interpolates the end points.

Figure 6:
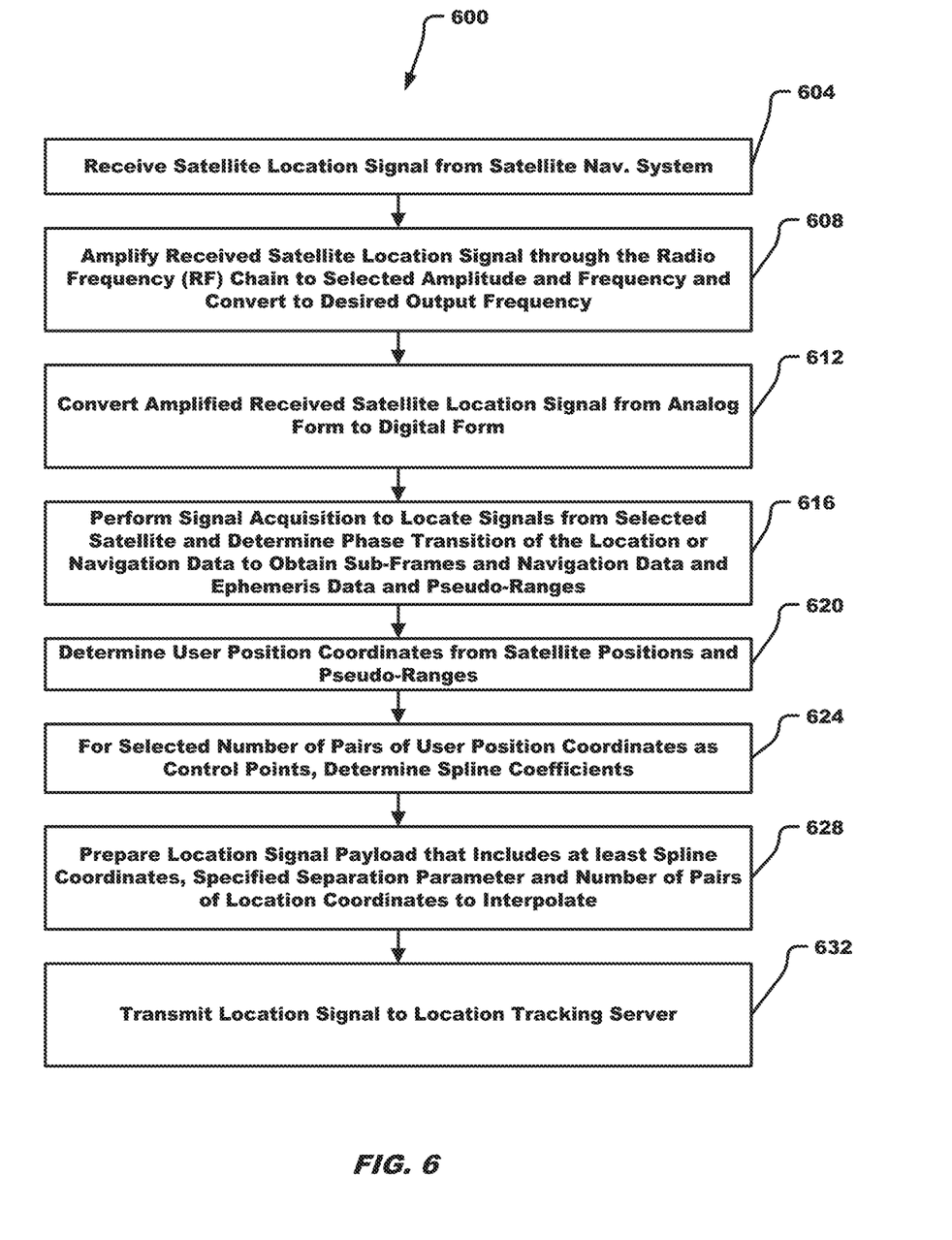
FIG. 6 is a flow diagram of a method for satellite navigation system location encoding in accordance with embodiments of the present disclosure.

With reference now to FIG. 6, various operations of a location tracking device 102 will be described in accordance with at least some embodiments of the present disclosure.

The method 600 begins with the location tracking device 102 receiving a satellite location signal from the satellite navigation system 108 (step 604). The satellite location signal comprises location of navigation data.

The method 600 may continue by the location tracking device 102 amplifying the received satellite location signal comprising the coordinates through radio frequency (RF) chain to a selected amplitude and frequency and converting it to a desired output frequency (step 608).

The method 600 can continue by the location tracking device 102 converting the amplified received satellite location signal from analog form to digital form (step 612).

The method 600 can continue by the location tracking device 102 performing signal acquisition to locate satellite location signals from a selected satellite and determining a phase transition of the location or navigation data in the signals to obtain sub-frames and navigation data and ephemeris data and pseudo-ranges (step 616).

The method 600 can continue by the location tracking device 102 determining user or location tracking device position or satnav coordinates from the satellite positions and pseudo-ranges (step 620).

The method 600 can continue by the location tracking device 102 using a selected number of satnav coordinate pairs, in the received location signal and buffered in memory, as control points to determine spline coefficients (step 624).

The method 600 can continue by the location tracking device 102 preparing the location signal payload including at least the spline coordinates, specified separation parameters (e.g., $t_{start}$ and $\Delta t$), and number of pairs of satnav coordinates to be interpolated by the location tracking server 200 (step 628).

The method 600 can continue by the location tracking device 102 assembling the header, payload, and trailer into one or more packets and transmitting the location signal packets to the location server 200 (step 632).

Figure 7:
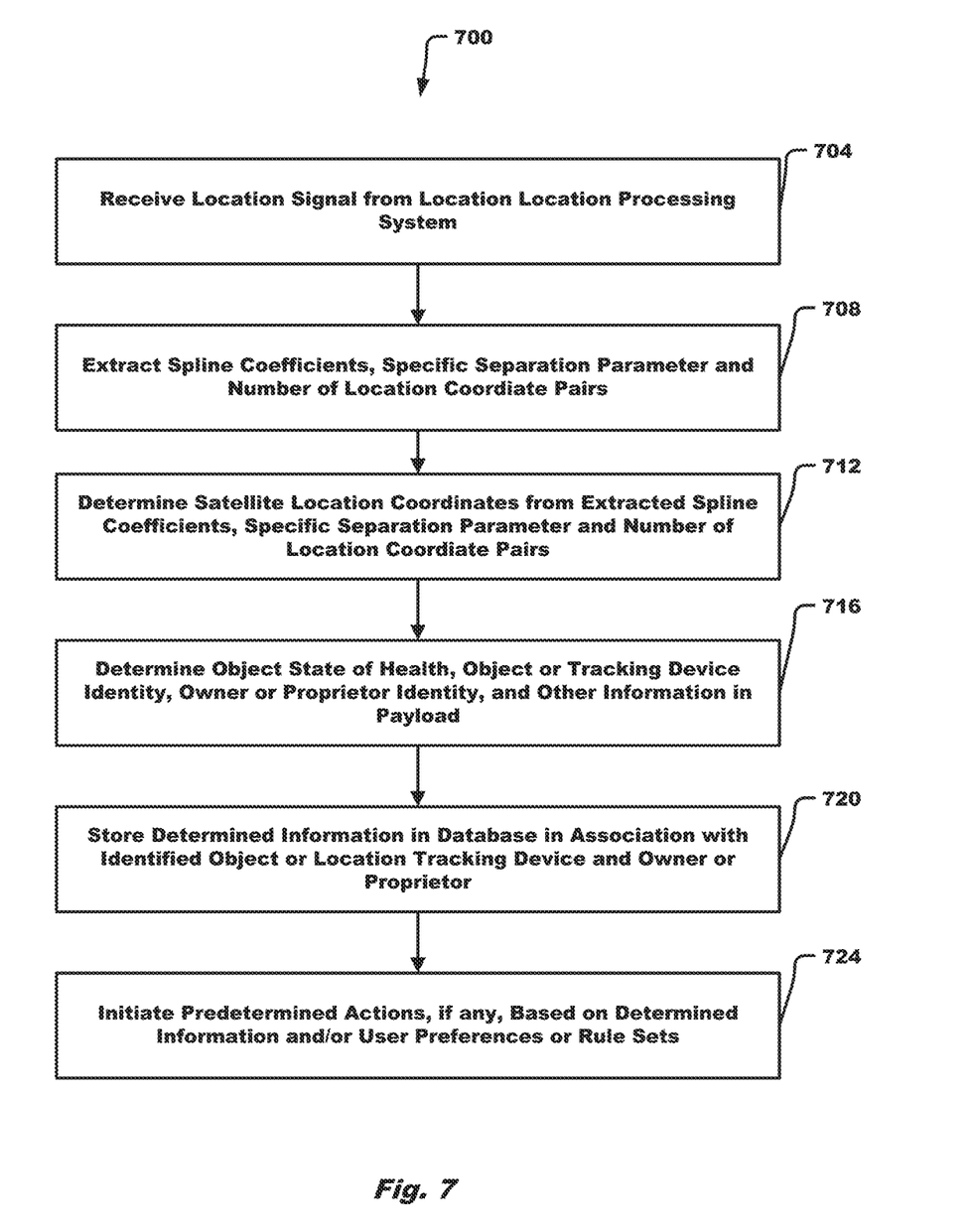
FIG. 7 is a flow diagram of a method for satellite navigation system location decoding in accordance with embodiments of the present disclosure.

With reference now to FIG. 7, various operations of a location tracking system 104 will be described in accordance with at least some embodiments of the present disclosure.

The method 700 begins with the location tracking server 200 receiving from the location tracking device 102 the location signal packets (step 704).

The method 700 can continue by the server 200 assembling and depacketizing the packets and extracting the spline coefficients, specific separation parameter, and number of location or satnav coordinate pairs to be interpolated (step 708).

The method 700 can continue by the server 200 determining the satellite location or satnav coordinates from the extracted spline coefficients, specific separation parameter, and number n of satnav coordinate pairs (step 712).

The method 700 can continue by the server 200 determining the object state of health, object or location tracking device identity, owner or proprietor identity, and other information in the payload (step 716).

The method 700 can continue by the server 200 storing the determined information in the database in association with the identified object or location tracking unit and owner or proprietor (step 720).

The method 700 can continue by the server 200 initiating predetermined actions, if any, based on the determined information and/or user preferences or rule sets (step 724).

Any of the steps, functions, and operations discussed herein can be performed continuously and automatically.

While the flowcharts have been discussed and illustrated in relation to a particular sequence of events, it should be appreciated that changes, additions, and omissions to this sequence can occur without materially affecting the operation of the disclosed embodiments, configuration, and aspects.

The exemplary systems and methods of this disclosure have been described in relation to radionavigation. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

For example, the location coordinates are not limited to latitude and longitude but can include other location information, such as elevation or altitude, bearing, acceleration, and velocity.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

As used herein, the singular forms "a," "an," and "the" are intended to include not only the singular but also the plural forms as well, unless the context clearly indicates otherwise. As such, the terms "a" (or "an"), "one or more," and "at least one" can be used interchangeably herein. It is also to be noted that the terms "comprising," "including," and "having" can be used interchangeably.

It will be further understood that the terms "include," "including," "includes," "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B, and C together. When each one of A, B, and C in the above expressions refers to an element, such as X, Y, and Z, or a class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," "compute," and variations thereof, as used herein, are used interchangeably and include any type of methodology, process, mathematical operation, or technique.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It should be understood that every maximum numerical limitation given throughout this disclosure is deemed to include each and every lower numerical limitation as an alternative, as if such lower numerical limitations were expressly written herein. Every minimum numerical limitation given throughout this disclosure is deemed to include each and every higher numerical limitation as an alternative, as if such higher numerical limitations were expressly written herein. Every numerical range given throughout this disclosure is deemed to include each and every narrower numerical range that falls within such broader numerical range, as if such narrower numerical ranges were all expressly written herein.

What is claimed is:

1. A method, comprising:
receiving, by a microprocessor of a location tracking device, via an antenna of the location tracking device, a plurality of radionavigation signals from a plurality of satellites, each radionavigation signal comprising orbital data associated with a spatial position of a respective satellite and a time of radionavigation signal transmission by the respective satellite;
determining, by the microprocessor of the location tracking device, a plurality of spatial positions associated over time with the location tracking device based on the plurality of radionavigation signals;
transforming, by the microprocessor, the plurality of spatial positions into a plurality of spline coefficients defining a spline curve; and
transmitting, by the microprocessor, via the antenna, the spline coefficients, a timing parameter, and a number of the plurality of spatial positions to a location tracking server.

2. The method of claim 1, wherein the microprocessor determines the plurality of spatial positions by trilateration, wherein the spline curve is defined by a cubic polynomial, and wherein the timing parameter comprises a start time for an interpolation and a time interval between adjacent spatial positions.

3. The method of claim 1, wherein the plurality of spatial positions each comprise a latitude and longitude and wherein the transforming comprises:
determining, by the microprocessor and using a selected polynomial equation, a first set of spline coefficients for a plurality of pairings of a latitude in the plurality of spatial positions and a corresponding timestamp; and
determining, by the microprocessor and using the selected polynomial equation, a second set of spline coefficients for a plurality of pairings of a longitude in the plurality of spatial positions and a corresponding timestamp, wherein the spline coefficients transmitted by the microprocessor comprise the first and second sets of spline coefficients.

4. The method of claim 3, wherein the first and second sets of spline coefficients are different from each other.

5. The method of claim 4, further comprising:
determining, by the microprocessor, that a path of travel of the location tracking device has passed through a transition point; and
in response, determining, by the microprocessor and using the selected polynomial equation, a third set of spline coefficients for a plurality of pairings of a latitude in the plurality of spatial positions and a corresponding timestamp; and
determining, by the microprocessor and using the selected polynomial equation, a fourth set of spline coefficients for a plurality of pairings of a longitude in the plurality of spatial positions and a corresponding timestamp, wherein the first and third sets of spline coefficients are different from each other and the second and fourth sets of spline coefficients are different from each other.

6. The method of claim 5, wherein the determining that a path of travel of the location tracking device has passed through a transition point comprises at least one of:
determining that the first set of spline coefficients cannot be used to interpolate a latitude corresponding to a selected location on the path of travel; and
determining that the second set of spline coefficients cannot be used to interpolate a longitude corresponding to the selected location on the path of travel.

7. The method of claim 5, wherein a first segment of the path of travel and a second segment of the path of travel are separated by the transition point and wherein the first and second segments define a piecewise polynomial.

8. A location tracking device, comprising:
an antenna;
a network interface in signal communication with the antenna;
a microprocessor coupled with the network interface; and
a memory coupled with and readable by the microprocessor storing therein a set of instructions that, when executed by the microprocessor, cause the microprocessor to:
- receive a plurality of radionavigation signals from a plurality of satellites, via the antenna and network interface, each radionavigation signal comprising orbital data associated with a spatial position of a respective satellite and a time;
- determine a plurality of spatial positions associated over time with the location tracking device based on the plurality of radionavigation signals;
- convert the plurality of spatial positions into a plurality of spline coefficients defining a spline curve; and
- transmit, via the network interface and antenna, the spline coefficients, a timing parameter, and a number of the plurality of spatial positions to a location tracking server.

9. The location tracking device of claim 8, wherein the microprocessor determines the plurality of spatial positions by trilateration, wherein the spline curve is defined by a cubic polynomial, and wherein the timing parameter comprises a start time for an interpolation and a time interval between adjacent spatial positions.

10. The location tracking device of claim 8, wherein the plurality of spatial positions each comprise a latitude and longitude and wherein the microprocessor converts the plurality of spatial positions into the plurality of spline coefficients by:
- determining, using a selected polynomial equation, a first set of spline coefficients for a plurality of pairings of a latitude in the plurality of spatial positions and a corresponding timestamp; and
- determining, using the selected polynomial equation, a second set of spline coefficients for a plurality of pairings of a longitude in the plurality of spatial positions and a corresponding timestamp, wherein the spline coefficients transmitted by the microprocessor comprise the first and second sets of spline coefficients.

11. The location tracking device of claim 10, wherein the first and second sets of spline coefficients are different from each other.

12. The location tracking device of claim 11, wherein execution of the instructions by the microprocessor cause the microprocessor to:
- determine that a path of travel of the location tracking device has passed through a transition point; and
- in response:
  - determine, using the selected polynomial equation, a third set of spline coefficients for a plurality of pairings of a latitude in the plurality of spatial positions and a corresponding timestamp; and
  - determine, using the selected polynomial equation, a fourth set of spline coefficients for a plurality of pairings of a longitude in the plurality of spatial positions and a corresponding timestamp, wherein the first and third sets of spline coefficients are different from each other and the second and fourth sets of spline coefficients are different from each other.

13. The location tracking device of claim 12, wherein the microprocessor determines that a path of travel of the location tracking device has passed through a transition point by at least one of:
- determining that the first set of spline coefficients cannot be used to interpolate a latitude corresponding to a selected location on the path of travel; and
- determining that the second set of spline coefficients cannot be used to interpolate a longitude corresponding to the selected location on the path of travel.

14. The location tracking device of claim 12, wherein a first segment of the path of travel and a second segment of the path of travel are separated by the transition point and wherein the first and second segments define a piecewise polynomial.

* * * * *